United States Patent [19]

Anderson

[11] 4,259,305

[45] Mar. 31, 1981

[54] SUBSTANTIALLY PURE CYCLIC PHOSPHONITRILIC CHLORIDE TRIMER

[75] Inventor: Larry W. Anderson, Baton Rouge, La.

[73] Assignee: Ethyl Corporation, Richmond, Va.

[21] Appl. No.: 108,511

[22] Filed: Dec. 31, 1979

Related U.S. Application Data

[63] Continuation-in-part of Ser. No. 71,392, Aug. 30, 1979, abandoned.

[51] Int. Cl.³ .............................................. C01B 25/10
[52] U.S. Cl. .................................................... 423/300
[58] Field of Search ............. 423/300; 23/293 R, 299

[56] References Cited

U.S. PATENT DOCUMENTS

| | | | |
|---|---|---|---|
| 2,862,799 | 12/1958 | Dittmar et al. | 423/300 |
| 3,008,799 | 11/1961 | Paddock et al. | |
| 3,378,353 | 4/1968 | Hands | 423/300 |
| 3,379,510 | 4/1968 | Jaszka. | |
| 3,677,720 | 7/1972 | Maund et al. | |

OTHER PUBLICATIONS

Chemical Abstract 159648d.

*Primary Examiner*—Herbert T. Carter
*Assistant Examiner*—Wayne A. Langel
*Attorney, Agent, or Firm*—Donald L. Johnson; John F. Sieberth

[57] ABSTRACT

A method for the separation of phosphonitrilic chloride trimer from mixtures containing other higher cyclic and linear phosphonitrilic chlorides involves contacting the crude phosphazene mixture with a ketone and preferably in the presence of a solvent and water so that a separable liquid fraction whose phosphazene constituent consists essentially of cyclic phosphonitrilic chloride is formed. The fraction is then separated and the trimer easily isolated by known methods in the art.

10 Claims, No Drawings

SUBSTANTIALLY PURE CYCLIC PHOSPHONITRILIC CHLORIDE TRIMER

This is a continuation-in-part of copending application Ser. No. 71,392 filed Aug. 30, 1979, abandoned.

This invention relates to a method for the separation of phosphonitrilic chloride trimer from mixtures containing other cyclic and linear phosphonitrilic chlorides

BACKGROUND

Substantially pure cyclic phosphonitrilic chloride trimer is a very desirable starting material, for example, in the polymerization reaction to form linear phosphonitrilic chloride polymers. Use of such high purity trimer enables formation of high molecular weight linear phosphonitrilic chloride polymers without the problems of crosslinking and gel formation associated with polymerization of mixtures of the trimer with various other phosphonitrilic chlorides such as the tetramer, pentamer and the like. Unfortunately, reactions known in the art for making the cyclic trimer result in mixtures of the trimer, tetramer, and other higher cyclics as well as some linear phosphazenes.

The general approach of prior art methods of separation of isomers of chlorophosphazene has involved utilization of the differences of boiling points of the isomers or exploitation of the different reactivities of the isomers with aqueous bases. Specific purification methods have involved extracting chlorophosphazene from petroleum ether solutions with sulfuric acid, U.S. Pat. No. 3,008,799; separating trimer and tetramer from the produced mixtures through distillation using a spinning band column, U.S. Pat. No. 3,379,510; contacting molten chlorophosphazenes with inert solvent vapor so as to selectively vaporize and entrain cyclic trimer and then condensing the vapor to form a solution of trimer in the solvent from which trimer together with some tetramer can be recovered, U.S. Pat. No. 3,677,720; and steam distilling chlorophosphazenes resulting in hydrolysis of the tetramer and higher forms and hence separation of the trimer, Radosavljevic, et al, *Glas. Hem. Drus., Beograd* 1971, 36(5–6), 189–91, Chemical Abstracts, Vol. 77, p. 540, 159648d (1972). In addition, U.S. Pat. No. 3,378,353 describes a controlled crystallization procedure wherein trimeric phosphonitrilic chloride is separated from mixtures thereof with tetramer in proportions of trimer to tetramer of at least 70:30 by weight by dissolving the mixture in an organic solvent such as petroleum ether, gasoline or kerosene, monochlorobenzene, carbon tetrachloride, symmetrical tetrachloroethane, dioxane, benzene, toluene, xylene and carbon disulfide, at a temperature sufficient to effect complete dissolution (generally about 50° to about 70° C.), cooling the solution until the constant temperature is reached at which the trimer begins to crystallize out (generally between about 20° and about 50° C.), and filtering the solution substantially at the constant temperature to remove the crystals of substantially pure trimer which separate at that temperature; and U.S. Pat. No. 2,862,799 describes a process for separating substantially pure tri-(phosphonitrilic chloride) from a mixture comprising this compound and at least one of its higher polymers by contacting the mixture with a liquid monohydric alcohol at a temperature and for a period of time sufficient to cause said higher polymer to pass into the liquid phase of the alcohol while leaving substantially pure tri-(phosphonitrilic chloride) in the solid state, and separating said tri-(phosphonitrilic chloride) from the liquid phase.

THE INVENTION

According to this invention there is provided a process for the separation of cyclic phosphonitrilic chloride trimer from a mixture containing said trimer as well as other phosphonitrilic chlorides which comprises contacting the mixture with a suitable amount of a ketone so that a separable fraction having a phosphonitrilic chloride constituent consisting essentially of said trimer is formed. In a preferred embodiment a mixture of a ketone and an inert organic solvent is contacted with the crude mixture containing the trimer and the other phosphonitrilic chlorides. In a particularly preferred embodiment the crude mixture is contacted with the combination of a ketone, an inert organic solvent (preferably an aromatic solvent, most preferably monochlorobenzene) and water. The process of this invention functions by causing a phase separation between the tetramer and higher molecular weight phosphonitrilic chlorides on the one hand, and the cyclic trimer on the other. The tetramer and higher phosphonitrilic chlorides react to form compounds which are insoluble in the separable trimer fraction (usually containing trimer, ketone and solvent, when used), and they generally precipitate into a solid phase. The phases can thus be separated by the simple expedient of decantation, filtration, or siphoning. Substantially pure trimer can then be easily isolated from this separated fraction by methods known to the art such as crystallization or distillation. This simple and convenient process yields trimer of uniform molecular weight required in the manufacture of phosphazene polymers.

Ketones suitable for use in the present process are those which are liquid under the reaction conditions and include monoketones and polyketones, both cyclic and non-cyclic. These may be saturated or unsaturated. Saturated aliphatic ketones include acetone, methyl ethyl ketone, diethyl ketone, acetylacetone, 2,3-butanedione, 2,6-diethyl-4-heptanone, 4-chloro-2-pentanone, methyl nonyl ketone, and the like with acetone being particularly preferred. Unsaturated aliphatic ketones include ethyl vinyl ketone, 3-penten-2-one, 5-hexen-2-one, 3-butyn-2-one and the like. Cyclic ketones which may be used herein include the aromatic and the cyclo-aliphatic ketones. Aromatic ketones which find use in the present process include benzophenone (phenyl ketone), acetophenone (methyl phenyl ketone), n-pentyl phenyl ketone, propyl-m-tolyl ketone, trans-4-phenyl-3-buten-2-one and the like. The cyclic ketones include cyclopentanone, 1,4-benzoquinone, and the like. The chemical literature contains reference to numerous and sundry ketones which are liquid under the present reaction conditions and which are thus suitable for use in the present process.

These ketones may be used either singly or in combination in order to effect the separation according to this invention. Suitable amounts of the ketone or combinations thereof can vary widely according to such factors as the temperature used, the make-up of the crude phosphonitrilic chloride mixture being treated, and the like. Generally the amount of ketone based on the weight of the crude phosphonitrilic chloride mixture falls within the range of about 20:1 to about 1:20. However, preferably the amount of the ketone will be at least equal to the amount of crude mixture being treated.

In those embodiments of this invention in which the ketone is used in combination with an inert organic solvent (i.e., a solvent which is inert in the process), preferably the solvent is an aromatic solvent such as monochlorobenzene, dichlorobenzene, toluene, xylene, benzene, tetrahydronaphthalene, 1-methylnaphthalene, mesitylene, ethylbenzene, and the like, with monochlorobenzene being particularly preferred. Other solvents which may also be used herein include tetrachloroethane, hexane, heptane, cyclohexane, petroleum ether, gasoline, kerosene, and the like. Although not critical, the amount of inert organic solvent used in the present process generally falls within the range of about 10:1 to about 1:10, preferably from about 5:1 to about 2:1 on a weight-to-weight basis based on the total weight of the crude phosphonitrilic chloride mixture. If desired, amounts of the solvent outside these ranges may be employed herein. When water is employed, it is preferably used in amounts within the range of from about 10:1 to about 1:1 on a weight-to-weight basis based on the weight of the crude phosphonitrilic chloride mixture.

In a preferred aspect of this invention the temperature of the mixture resulting from commingling of the crude phosphonitrilic chloride, ketone and the inert organic solvent and water (when employed) is maintained within the range of from about 50° F. (10° C.) to about 250° F. (121.1° C.) for the duration of the reaction. When the mixture contains crude phosphonitrilic chloride, ketone, an inert organic solvent, and water, it is particularly preferred that the contacting be performed at a temperature in the range of about 100° F. (37.8° C.) to about 150° F. (65.6° C.). While contacting times of up to three or four days may be employed, times of not more than 48 hours afford effective separation of the cyclic trimer at ambient temperatures (e.g. about 25° C.). Under preferred conditions, complete separation of the trimer may be effected in time periods of 2 hours or less.

The process of this invention generally involves contacting, in a suitable container, the crude phosphonitrilic chloride mixture and the ketone (and an inert organic solvent and water if used) at any suitable temperature, such as for example a temperature in the range of room temperature up to about 250° F. (121.1° C.) or even as high as 400° F. (204.4° C.). Normally temperatures of from about 77° F. (24° C.) to about 150° F. (65.6° C.) are entirely satisfactory. The sequence of addition is not critical and the ingredients may be added in the order desired. For example, the ketone can be first added followed by addition of the water after which time a mixture of the crude phosphonitrilic chloride in the inert organic solvent is introduced. Alternatively, the ingredients may be added concurrently. Stirring is usually commenced after the ingredients have been contacted, and when temperatures above (or below) ambient temperatures are employed, heating (or cooling) is generally initiated along with stirring. The reaction can then proceed to completion without further manipulation. Because the tetramer and higher phosphonitrilic chlorides form a sediment or a separate phase in this reaction, the end point may be determined by the simple expedient of withdrawing a sample of the trimer containing layer and analyzing that sample by means known to the art, e.g., via phosphorus NMR ($^{31}P$ NMR) and Vapor Phase Chromatography (VPC). When analysis indicates that this layer has a phosphonitrilic chloride constituent consisting essentially of the trimer, the layer can then be removed by decantation, siphoning, distillation or other methods known to the art. The cyclic trimer is then isolated as a white crystalline solid from the remaining constituents of the trimer containing layer (generally unreacted ketone and solvent) by methods known in the art such as crystallization or distillation.

Particular embodiments of the present invention are reflected in the following examples:

EXAMPLE 1

A crude mixture of phosphazenes was contacted at room temperature with acetone so that the relative weight percent of the resulting solution was 18:72 respectively. $^{31}P$ NMR analysis indicated that the crude mixture (prepared by the process of copending application Ser. No. 592,875, filed July 3, 1975) had the following composition.

| Phosphazene | Mole-Percent Phosphorus |
| --- | --- |
| Cyclic trimer | 82.4 |
| Cyclic tetramer | 9.6 |
| Cyclic pentamer | 6.0 |
| Cyclic hexamer | |
| Cyclic heptamer | 0.7 |
| Higher cyclics and linears | 1.4 |

The solution was allowed to stand for a total of 22 hours during which time a white precipitate formed. At certain times during this period samples of the acetone solution were withdrawn and analyzed by Vapor Phase Chromatography (VPC). Table I tabulates the results obtained.

TABLE I

| Time | Weight Percent Trimer | Weight Percent Tetramer | weight Percent Pentamer |
| --- | --- | --- | --- |
| $T_o$ | 20.3 | 0.77 | 0.16 |
| 1 Hr. | 19.5 | 0.52 | 0.19 |
| 2 Hrs. | 19.8 | 0.20 | n.d.* |
| 22 Hrs. | 19.2 | n.d. | n.d. |

*n.d. signifies none detected.

EXAMPLE 2 in this instance an 11:30:59 weight percent solution of crude phosphonitrilic chloride (from same mixture as used in Example 1), monochlorobenzene and acetone respectively, was allowed to stand at room temperature for a total of 23 hours. The results as derived from VPC analyses are listed in Table II.

TABLE II

| Time | Weight Percent Trimer | Weight Percent Tetramer |
| --- | --- | --- |
| $T_o$ | 9.98 | 0.36 |
| 1 Hr. | 9.90 | 0.38 |
| 2 Hrs. | 9.94 | 0.21 |
| 23 Hrs. | 9.76 | n.d. |

EXAMPLE 3

In this instance, 225 ml of acetone, 674 ml of water and 750 ml of a 25 weight percent solution of the crude phosphazene mixture (described in Example 1) in monochlorobenzene were commingled. This mixture was then heated to 130° F. with stirring and kept at that temperature for 3.5 hours. A sample of the liquid fraction was analyzed with VPC-$^{31}$P NMR upon reaching the 130° F. temperature (T-130) and again after 3.5 hours. The results are tabulated below:

TABLE III

| Phosphazene | Fraction Content | |
|---|---|---|
| | Wt. Percent at T-130 | Wt. Percent at 3.5 Hrs. |
| Trimer | 22.2 | 20.3 |
| Tetramer | 2.6 | <0.1 |
| Pentamer } | 1.6 | 0.5 |
| Hexamer } | | |
| Heptamer | 0.19 | 0.17 |
| High cyclics and linears | 0.38 | 0.26 |

EXAMPLE 4

1,003 grams of a 22 weight percent solution of the crude phosphonitrilic chloride (described in Example 1) in monochlorobenzene was mixed with 800.2 grams of water and 200.3 grams of acetone at 128±5° F. and stirred at this temperature for a total of 4 hours. The mixture was analyzed upon reaching this temperature and at 1 hour increments by Vapor Phase Chromatography and the results are tabulated in Table IV below.

TABLE IV

| Time | Wt. Percent Trimer | Wt. Percent Tetramer | Wt. Percent Pentamer |
|---|---|---|---|
| T$_o$ | 17.75 | 3.198 | 0.986 |
| 1 Hr. | 17.53 | 0.412 | 0.332 |
| 2 Hrs. | 18.08 | n.d. | n.d. |
| 3 Hrs. | 19.02 | n.d. | n.d. |

The crude phosphazene mixtures from which the trimer is separated by the process of this invention may be prepared in a variety of ways. For example, U.S. Pat. Nos. 3,249,397; 3,347,643; and 3,656,916 describe methods for the preparation of such mixtures. The preferred method is that disclosed by Hudson and Dominick in their application Ser. No. 592,875, filed July 3, 1975, now U.S. Pat. No. 4,196,179, which is incorporated herein as if fully set forth. That application describes the preparation of cyclic phosphonitrilic halide, preferably chloride, oligomer mixtures by reaction of phosphorus trichloride, chlorine and ammonia at temperatures from 65° C. to 180° C. in which the reactants are simultaneously fed to an agitated inert solvent at a rate such that the phosphorus trichloride concentration is at most stoichiometric relative to the chlorine and ammonia concentration, and such that petroleum ether insoluble phosphonitrilic chloride formation is suppressed and recovering the cyclic phosphonitrilic halide oligomer mixture without extracting petroleum ether insoluble materials since these are not produced.

Phosphonitrilic chloride trimer is useful as a gasoline additive to control surface ignition (see U.S. Pat. No. 2,833,635), as a monomer for the preparation of linear polymeric chlorophosphazene, and as a chemical intermediate. The trimer also has pesticidal properties having been found particularly toxic to the greenhouse leaf tyer.

Other modifications and variations of the present invention will now be readily apparent in light of the above teachings. It is therfore to be understood that changes may be made in the particular embodiments described above which are within the spirit and intended scope of the invention as defined in the appended claims.

What is claimed is:

1. A process for the separation of cyclic phosphonitrilic chloride trimer from a mixture containing said trimer as well as other phosphonitrilic chlorides which comprises contacting said mixture with a ketone so that a separable fraction having a phosphonitrilic chloride constituent consisting essentially of said trimer is formed, the amount of said ketone based on the weight of said mixture falling within the range of about 20:1 to about 1:20.

2. A process of claim 1 wherein said mixture is contacted with a mixture of a ketone, an inert organic solvent and water.

3. A process of claim 2 wherein said ketone is acetone and said solvent is monochlorobenzene.

4. A process of claim 3 wherein the contacting is performed at a temperature in the range of about 100° F. to about 150° F.

5. A process of claim 2 wherein said ketone is a linear lower saturated aliphatic ketone and said solvent is an aromatic solvent.

6. A process of claim 1 wherein said mixture is contacted with a mixture of a ketone and an inert organic solvent.

7. A process of claim 1 wherein said fraction is separated and the trimer isolated therefrom.

8. A process of claim 1 wherein said ketone is a linear lower saturated aliphatic ketone.

9. A process of claim 1 wherein said ketone is acetone.

10. A process of claim 1 wherein said mixture and said ketone are contacted at a temperature of from about 50° F. to about 250° F.

* * * * *